US011966759B2

(12) United States Patent
Li et al.

(10) Patent No.: US 11,966,759 B2
(45) Date of Patent: Apr. 23, 2024

(54) VEHICLE, ADVICE PROVIDING APPARATUS AND METHOD

(71) Applicant: Volvo Car Corporation, Gothenburg (SE)

(72) Inventors: Wei Li, Shanghai (CN); Jianyun Jiang, Shanghai (CN); Tong Li, Shanghai (CN); Si Chen, Shanghai (CN)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/726,692

(22) Filed: Apr. 22, 2022

(65) Prior Publication Data

US 2022/0342681 A1  Oct. 27, 2022

(30) Foreign Application Priority Data

Apr. 23, 2021 (CN) .......................... 202110441278.2

(51) Int. Cl.
*G06F 9/451* (2018.01)
*B60W 50/14* (2020.01)

(52) U.S. Cl.
CPC ............. *G06F 9/451* (2018.02); *B60W 50/14* (2013.01)

(58) Field of Classification Search
CPC ........ G06F 9/451; G06F 9/453; B60W 50/14; B60W 50/0097; B60W 2050/146; B60K 2370/11; B60K 2370/161; B60K 35/00; B60K 2370/56; B60K 2370/566; B60K 2370/573; B60K 2370/589; B60K 2370/592

See application file for complete search history.

(56) References Cited

U.S. PATENT DOCUMENTS

| | | | | |
|---|---|---|---|---|
| 6,401,036 | B1* | 6/2002 | Geier | G01C 21/165 701/472 |
| 9,946,531 | B1* | 4/2018 | Fields | B60W 50/02 |
| 11,237,555 | B1* | 2/2022 | Chan | G05D 1/0077 |
| 2005/0125148 | A1* | 6/2005 | Van Buer | G01C 21/3617 340/995.19 |
| 2007/0225910 | A1* | 9/2007 | Fujiwara | G01C 21/3605 701/425 |
| 2009/0002148 | A1* | 1/2009 | Horvitz | G08G 1/0112 340/514 |

(Continued)

*Primary Examiner* — Daniel W Parcher
(74) *Attorney, Agent, or Firm* — Clements Bernard Walker; Christopher L. Bernard

(57) ABSTRACT

An advice providing apparatus for a vehicle including: a first interface configured to communicate with one or more human-machine interface APPs of one or more human-machine interfaces (HMIs) of the vehicle; a second interface configured to receive data from in-vehicle devices including a database, a sensing unit and a communication unit; and a processing module configured to: calculate one or more predictions for a potential query from a user of the vehicle based on the received data; select a prediction from the calculated predictions that is associated with a nonrepresentational input received via at least one HMI of the one or more HMIs from the user; generate an operation advice based on the selected prediction; and output the generated operation advice to an HMI APP of the one or more HMI APPs.

11 Claims, 4 Drawing Sheets

(56) References Cited

U.S. PATENT DOCUMENTS

| | | | |
|---|---|---|---|
| 2010/0312369 A1* | 12/2010 | Dollar, Jr. | G06F 16/686 |
| | | | 707/E17.101 |
| 2016/0148610 A1* | 5/2016 | Kennewick, Jr. | G10L 15/18 |
| | | | 704/240 |
| 2019/0187706 A1* | 6/2019 | Zhou | G06N 20/00 |
| 2021/0383209 A1* | 12/2021 | Brahma | G06V 10/82 |

* cited by examiner

VEHICLE, ADVICE PROVIDING APPARATUS AND METHOD

CROSS-REFERENCE TO RELATED APPLICATION

The present disclosure claims the benefit of priority of co-pending Chinese Patent Application No. 202110441278.2, filed on Apr. 23, 2021, and entitled "Advice Providing Apparatus, System and Method for Vehicle," the contents of which are incorporated in full by reference herein.

TECHNICAL FIELD

The present disclosure relates to an advice providing solution for a vehicle.

BACKGROUND

Based on the trends of electrification, intelligence, interconnection, and sharing for vehicles of the automobile industry, digital cockpit solutions bring new opportunities for the automobile value chain. Digital cockpit solutions put forward higher requirements for human-machine interactions in the vehicle because the core of the digital cockpit solutions is enjoyable user experience.

In the prior art, various human-machine interactions and corresponding applications, also abbreviated as APPs, for vehicles have been developed. A user of a vehicle, e.g., an occupant in the vehicle, can learn information on vehicle status and road conditions, and make settings, such as cruise control, Bluetooth hands-free, heating settings, and playing music, by interacting with the vehicle.

However, prior art human-machine interactions still have been unsatisfactory for many aspects. For example, if a human-machine interaction application of a vehicle receives an input from a user of the vehicle, it may not accurately and quickly understand the user's real needs, thereby resulting in many interactions between the user and the vehicle failing to meet the user's real needs.

SUMMARY

According to an embodiment of the disclosure, an advice providing apparatus for a vehicle is provided. The advice providing apparatus includes: a first interface configured to communicate with one or more human-machine interface applications (HMI APPs) disposed on one or more human-machine interfaces (HMIs) of the vehicle; a second interface configured to receive data from in-vehicle devices including a database, a sensing unit and a communication unit; and a processing module. The processing module is configured to: calculate one or more predictions for a potential query from a user of the vehicle based on the received data; select a prediction from the calculated predictions that is associated with a nonrepresentational input received via at least one HMI of the one or more HMIs from the user; generate an operation advice based on the selected prediction; and output the generated operation advice to a suitable HMI APP of the one or more HMI APPs.

According to another embodiment of the disclosure, there is provided a vehicle including a database, a sensing unit, a communication unit, and an apparatus for providing advice. The database is configured to store historical data related to human-machine interactions, a vehicle status, and an environment status. The sensing unit and a communication unit are configured to collect or receive real-time data including data related to the human-machine interactions, the vehicle status, and the environment status. The apparatus for providing advice comprises: a first interface configured to communicate with one or more human-machine interface APPs of one or more human-machine interfaces (HMIs) of the vehicle; a second interface configured to receive historical data from the database and receive real-time data from the sensing unit and the communication unit; and a processing module. The processing module is configured to: calculate one or more predictions for a potential query from a user of the vehicle based on the historical data and the real-time data; select a prediction from the calculated predictions that is associated with a nonrepresentational input received via at least one HMI of the one or more HMIs from the user; generate an operation advice based on the selected prediction; and output the generated operation advice to an HMI APP of the one or more HMI APPs that corresponds to the at least one HMI.

According to yet another embodiment of the disclosure, there is provided an advice providing method including: calculating one or more predictions for a potential query from a user of the vehicle based on data received from in-vehicle devices including a database, a sensing unit, and a communication unit; selecting a prediction from the calculated predictions that is associated with a nonrepresentational input received via at least one HMI of the vehicle from the user; generating an operation advice based on the selected prediction; and outputting the generated operation advice to an HMI APP of the vehicle that corresponds to the at least one HMI.

According to yet another embodiment of the disclosure, there is provided a non-transitory computer-readable medium with instructions stored therein which, when executed, cause one or more processors to carry out the steps including: calculating one or more predictions for a potential query from a user of the vehicle based on data received from in-vehicle devices including a database, a sensing unit, and a communication unit; selecting a prediction from the calculated predictions that is associated with a nonrepresentational input received via at least one HMI of the vehicle from the user; generating an operation advice based on the selected prediction; and outputting the generated operation advice to an HMI APP of the vehicle that corresponds to the at least one HMI.

BRIEF DESCRIPTION OF THE DRAWINGS

Further advantages, features, aspects and details of the disclosure will be explained in more details in the following text with reference to exemplary embodiments which are illustrated in the attached drawings, in which.

DETAILED DESCRIPTION

Embodiments of the disclosure relate to providing an operation advice based on human-machine interactions in a vehicle.

According to an embodiment of the disclosure, metadata are obtained from various data sources, the obtained data are processed in the vehicle, for example, using a deep neural network deployed in the vehicle, and an operation advice is generated to minimize the number of interactions between a user of the vehicle and a human-machine interface (HMI) of the vehicle and to improve the interaction efficiency.

According to an embodiment of the disclosure, the operation advice is generated in a data-driven manner, in particular, a precise operation advice in line with the user's expectation is generated, and thus an intelligent service can be provided to the user of the vehicle. Thus, a "tailored" service for the user can be realized in the vehicle.

According to an embodiment of the disclosure, the metadata from various data sources are centrally managed in the vehicle and processed in the same way, and thus different HMI applications (APPs) of the vehicle can generate different pieces of operation advice that are highly consistent with each other.

According to an embodiment of the disclosure, the metadata including vehicle data and user data from the various data sources are locally stored in the vehicle, and the operation advice (i.e., service) based on local processing in the vehicle are directly output to HMI APPs of the vehicle. Thus, the solution of the embodiment has advantages of data security and data privacy. Moreover, the solution of the embodiment does not have the delay issue caused by multiple handshakes for establishing communications between the vehicle and external devices, e.g., a cloud server, another vehicle, or a roadside device.

According to an embodiment of the disclosure, data can be accumulated and updated with application of solutions based on embodiments of the disclosure to the vehicles. Then, the accumulated and updated data can be used as training data for retraining the deep neural network. Thus, the performance of solutions according to embodiments of the disclosure can be continuously improved.

Embodiments of the disclosure will be described with reference to the drawings.

Figure 1:
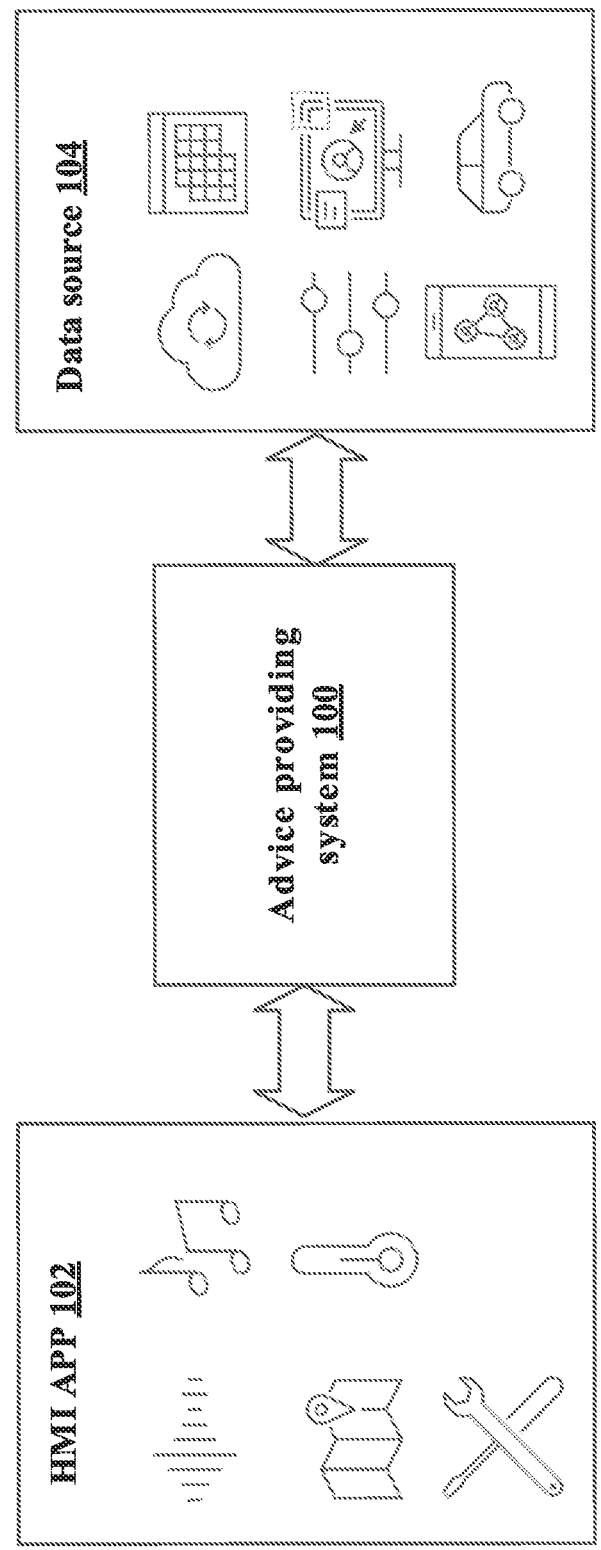
FIG. 1 is an exemplary environment in which an embodiment of the disclosure can be implemented.

FIG. 1 schematically illustrates an exemplary environment in which embodiments of the disclosure can be implemented. The exemplary environment of FIG. 1 includes an advice providing system 100, an HMI APP 102, and a data source 104. The advice providing system 100 is disposed in/on a vehicle, which is also be referred to as an in-vehicle system.

The HMI APP 102 is an APP of an HMI of the vehicle, that is, an application software of the HMI. The HMI may be implemented with various types, such as a touch screen, a speech control panel, or physical keys. The HMI may be implemented by means of an interaction media such as a central control panel, physical buttons, or a dashboard of the vehicle. The HMI APP 102 can realize functions for a user in the vehicle, such as playing music, navigating, searching nearby, and heating control. In an example, the HMI APP 102 includes multiple HMI APPs each of which is used for a respective HMI of the vehicle. For example, the HMI APP 102 includes a voice APP for an HMI that implements interactions by voice and a search APP for an HMI that implements interactions through a touch panel.

The data source 104 includes a variety of data sources. In an example, the data source 104 includes various data sources inside and outside the vehicle. For example, the data source 104 includes an in-vehicle sensor, an environmental sensor in a roadside system, a storage device in the vehicle or in a cloud server, and an intelligent device of a user of the vehicle.

The advice providing system 100 obtains data from the data source 104. For example, the advice providing system 100 obtains sensor data including vehicle status from the in-vehicle sensor and environment status from the environmental sensor, user schedule data including a calendar from the intelligent device of the user of the vehicle, transaction data generated in the vehicle including user transaction data generated through messaging and payment platforms (ecosystems) of the user, and user historical data from the storage device. The user historical data, for example, include the user's historical behaviors of braking and the corresponding braking habits, the user's historical behaviors of the seat adjustment and the corresponding seat adjustment preferences, and the user's historical behaviors of setting heating temperature and the corresponding temperature setting preferences.

Based on the architecture according to embodiments of the disclosure, as shown in FIG. 1, the advice providing system 100 functions as a "spacer layer" to isolate the HMI APP 102 from the data source 104. Based on such an architecture, the HMI APP 102 does not obtain metadata from the data source 104 directly, but receives a service output from the advice providing system 100 that is generated by processing the metadata in the advice providing system 100. For example, the HMI APP 102 receives an operation advice from the advice providing system 100. In this way, the security and privacy of the metadata including the vehicle data and the user data can be ensured.

Figure 2:
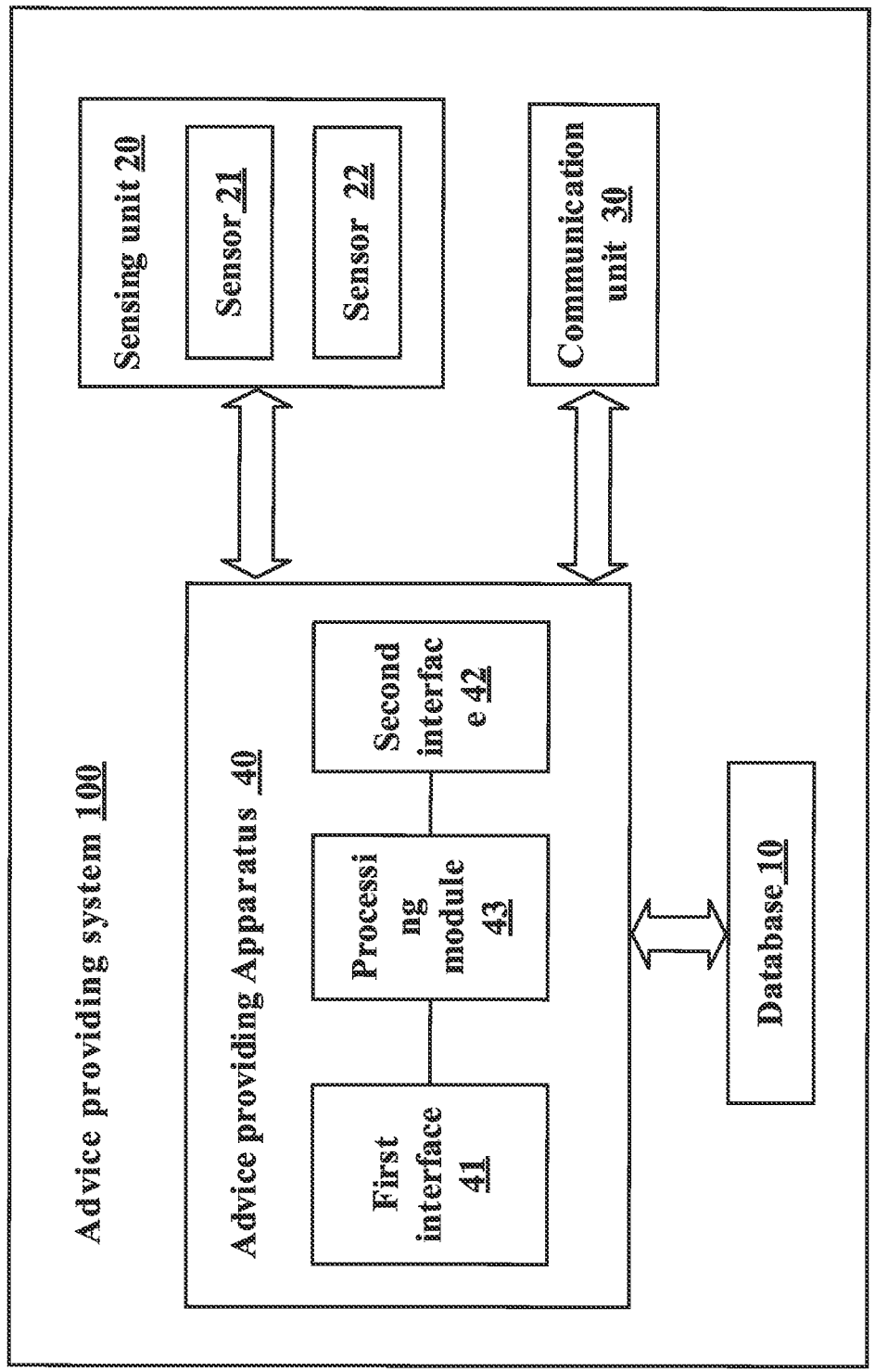
FIG. 2 is a schematic block diagram of an advice providing system for a vehicle according to an embodiment of the disclosure.

FIG. 2 shows an advice providing system 100 according to an embodiment of the disclosure. The advice providing system 100 includes a database 10, a sensing unit 20, a communication unit 30, and an advice providing apparatus 40.

The database 10 is disposed in an electronic controlling unit of the vehicle, such as a central controller, a domain controller, an ECU or a VCU of the vehicle. In an example, the database 10 includes multiple databases each of which is previously generated in an electronic controlling unit of in-vehicle systems, such as a braking system, a steering system and an infotainment system, respectively. The database 10 stores historical data related to interactions, vehicle status and environment status. That is to say, the database 10 stores historical interaction data, historical vehicle data, and historical environment data.

The historical interaction data may include data generated during one or more interactions between the user and an HMI of the vehicle. In an example, during an interaction through a touch screen, the historical interaction data may include the following contents: an air conditioning temperature, air volume, wind direction and air conditioning operating mode set by the user via the touch screen, and information presented on the touch screen as a response to the user setting. As another example, during an interaction by voice, the historical interaction data may include one or more rounds of verbal questions and answers.

The historical interaction data may also include user behavior data generated in the vehicle. The user behavior data may include a record of the user's braking behaviors and the user's braking habit/style calculated based on the record of braking behaviors; and a record of seat adjustments and the user's seat adjustment habit/preference calculated based on the record of seat adjustments.

The historical vehicle data may include historical data recording vehicle status. For example, the historical vehicle data include energy consumption curves of a powertrain of the vehicle under different environments/different operating conditions/different road conditions/different routes; and charge-discharge curves of a power battery of the vehicle under different energy states/different environments/different operating conditions/different road conditions/different routes.

The historical environment data may include historical data characterizing surroundings of the vehicle. For example, the historical environment data may include historical data related to object status, scenes and weather.

In an example, the historical interaction data, the historical vehicle data, and the historical environment data are interrelated. For example, the historical interaction data are generated in a specific vehicle state and in a specific environment state. In this case, a relational database can be used for storing such interrelated historical data so as to sufficiently retain the correlation of the historical data.

In an example, the volume of the historical data may be quite large and may exceed the storage threshold of the relational database. In this case, a distributed database cluster can be used to provide extension capabilities, which reduces the delay caused by processing such a large volume of the historical data.

In an example, a hybrid storage model of the relational database and the distributed database cluster can be utilized to store the historical data.

The sensing unit 20 is disposed in the vehicle and therefore is also referred to as an in-vehicle sensing unit. The sensing unit 20 collects real-time data. The collected real-time data may be transmitted directly to the advice providing apparatus 40. The collected real-time data may also be transmitted to the advice providing apparatus 40 after being pre-processed.

In an example, the sensing unit 20 includes an environmental sensor 21 and a vehicle status sensor 22. Both the environmental sensor 21 and the vehicle status sensor 22 are arranged in the vehicle.

The environmental sensor 21 can be used to capture environmental information around the vehicle. The environmental sensor 21 may include cameras (e.g., mono cameras, depth cameras, and/or surround view cameras) and/or radars (e.g., LiDARs, ultrasonic radars, and/or millimeter-wave radars). The cameras can acquire the environmental information around the vehicle by image analysis or video analysis. For example, the relative distance of the vehicle from the road side or obstacles can be acquired by the image analysis or video analysis. The radars can acquire the relative distance of the vehicle from the road side or obstacles by analyzing point clouds. The environmental sensor 21 may include a plurality of environmental sensors arranged at the periphery of the vehicle body. The arrangement of those environmental sensors allows for safety redundancy such that surroundings around the vehicle can be adequately surveyed and captured.

The vehicle status sensor 22 is used to capture vehicle status information. The vehicle status sensor 22 may include multiple vehicle status sensors that directly and indirectly measure vehicle status parameters. The vehicle status sensor 22 may include a wheel speed sensor, a suspension displacement sensor, an acceleration sensor, and a steering angle sensor.

The communication unit 30 is capable of providing a communication connection between the vehicle and an external device. The vehicle can receive real-time data from the external device via the communication unit 30. Wired and/or wireless communication links may be utilized between the vehicle and the external device. The wireless communication can be implemented as, for example, 3G/4G/5G, C-V2X, DSRC, Wi-Fi or Bluetooth, and combinations thereof. The external device includes a device that is not an integral part of the vehicle. The external device is, for example, a cloud server that communicates with the vehicle via a wireless network, an edge server that communicates with the vehicle via a wireless network, a roadside facility that communicates with the vehicle via a C-V2X module, another vehicle that is configured to wirelessly communicate with the vehicle, and an electronic device that is configured to wirelessly communicate with the vehicle, e.g., a smartphone carried by a nearby pedestrian.

The real-time data received from the external device via the communication unit 30 may include, for example, real-time interaction data, real-time vehicle data, real-time environment data and real-time navigation data.

The real-time environment data may include the real-time data characterizing an object around the vehicle, particularly an object that may collide with the vehicle, such as the type of the object (e.g., an obstacle, a pedestrian, a pet, or another vehicle), the state of the object (e.g., being stationary or moving, a moving speed or direction of the object), the position of the object (e.g., an absolute position, such as GNSS, GPS position, or a relative position with respect to a reference position, such as the distance to a traffic light), and the size of the object. The real-time environment data may further include the real-time data characterizing climate and weather, such as fog, hail, cloudy days, rain, visibility, temperature, wind speed, brightness and rainfall. The real-time environment data may further include the real-time data characterizing the current scene, such as highway, intersection and single-lane.

The real-time vehicle data may include the real-time data characterizing the current vehicle status, such as a traveling direction, a speed, and an acceleration of the vehicle; a current travel lane of the vehicle and a position relative to the lane; and the movement tendency of the vehicle.

The real-time navigation data may include map data and a navigation route containing the road section in which the vehicle is travelling. The real-time navigation data can be automatically transmitted to the vehicle from the external device based on the location information of the vehicle, or may be transmitted to the vehicle from the external device in response to a request from the vehicle to the external device.

It is noted that the real-time data obtained via the sensing unit 20 or the communication unit 30 may be directly used in subsequent data processing or may be used in the subsequent data processing after being pre-processed. For example, energy consumption data of the powertrain of the vehicle under various road conditions are obtained, and then pre-processed to generate a plurality of energy consumption characteristic curves each of which represents the change in the energy consumption of the powertrain over time under a specific road condition.

In an example, such pre-processing is performed in the external device, and then the processed results are sent to the vehicle from a wireless communication unit of the external device. This is advantageous as it reduces the amount of computation in the advice providing apparatus 40 and also reduces the required computational capacity of the advice providing apparatus 40.

The advice providing apparatus 40 is communicatively connected to the database 10, the sensing unit 20 and the communication unit 30, respectively. The advice providing apparatus 40 obtains the historical data from the database 10 and the real-time data from the sensing unit 20 and the communication unit 30, processes the obtained data to produce category-based predictions, selects one of the calculated predictions that satisfies an expectation of the user, and generates an operation advice based on the selected prediction.

Continuing with reference to FIG. 2, the advice providing apparatus 40 includes a first interface 41, a second interface 42 and a processing module 43. The first interface 41 is configured to communicate with the HMI APP 102. The second interface 42 is configured to obtain the historical data from the database 10 and the real-time data from the sensing unit 20 and the communication unit 30. The processing module 43 calculates the category-based predictions based on the historical data and the real-time data, selects one of the calculated predictions that satisfies the expectation of the user, and generates an operation advice based on the selected prediction. Then, the generated operation advice can be sent to the HMI APP 102 via the first interface 41. Thus, a number of interactions between the user and the vehicle can be minimized and thus the interaction efficiency is improved.

The advice providing apparatus 40 may be implemented by means of hardware or software or a combination of hardware and software, including code stored in a non-transitory computer-readable medium such as a memory and implemented as instructions executed by a processor. Regarding the part implemented by means of hardware, it may be implemented in an application-specific integrated circuit (ASIC), a digital signal processor (DSP), a data signal processing device (DSPD), a programmable logic device (PLD), a field programmable gate array (FPGA), a processor, a controller, a microcontroller, a microprocessor, an electronic unit, or a combination thereof. The part implemented by software may include a microcode, a program code or code segments. The software may be stored in a machine-readable storage medium, such as a memory.

It is noted that the advice providing apparatus 40 as well as the first interface 41, the second interface 42 and the processing module 43 are named functionally (logically) and their physical positions are not limited by their functional names. In other words, the first interface 41, the second interface 42 and the processing module 43 can be included in the same chip or circuit. The first interface 41, the second interface 42 and the processing module 43 can also be provided in different chips or circuits.

In an example, the advice providing apparatus 40 may include a memory and a processor. The instructions are stored in the memory. The instructions, when executed by the processor, cause the processor to execute the advice providing method according to embodiments of the present disclosure.

In an example, the advice providing apparatus 40 is implemented as in-vehicle software. The advice providing apparatus 40 can be disposed in a domain controller or a central controller or an electronic control unit of the vehicle.

Figure 3:
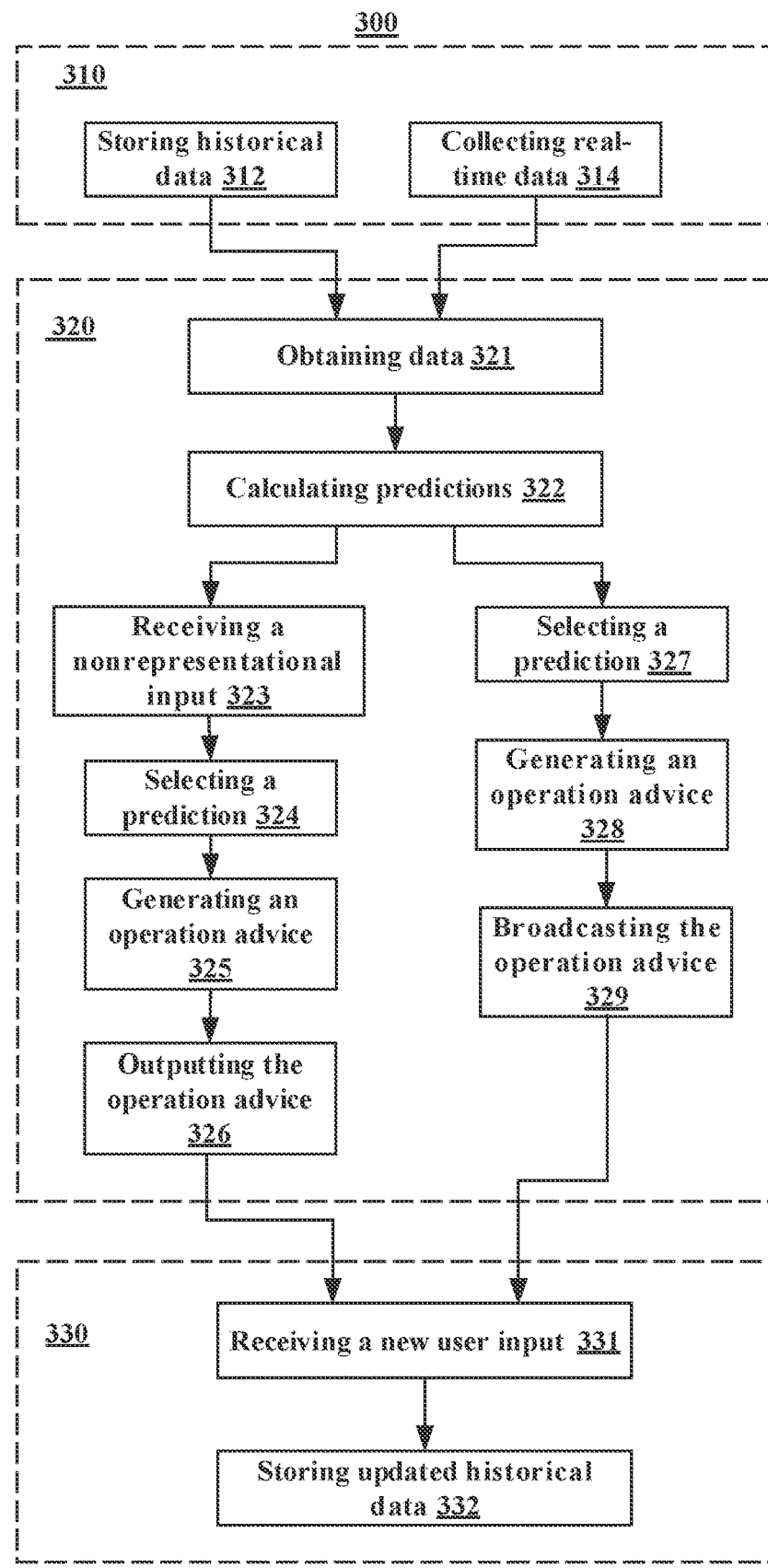
FIG. 3 shows an advice providing process according to an embodiment of the disclosure.

FIG. 3 illustrates an advice providing process 300 according to an embodiment of the present disclosure. The advice providing process 300 can be implemented by the above-mentioned advice providing system 100, and thus the above descriptions about the advice providing system 100 are also applicable here. As shown in FIG. 3, the advice providing process 300 includes a data collection process (block 310), a data processing process (block 320), and an updating process (block 330).

First, the data collection process is performed in block 310.

In block 312, the database 10 stores the historical data. The historical data include the historical interaction data, the historical vehicle data, and the historical environment data, as described above.

In block 314, the sensing unit 20 and the communication unit 30 collect the real-time data. The real-time data include the real-time vehicle data, the real-time environment data, and the real-time navigation data, as described above.

It is noted that the execution order of blocks 312 and 314 is not limited. For example, blocks 312 and 314 can be performed simultaneously, according to a predetermined time period, or in response to a triggering signal or instruction.

Next, the data processing process is performed in block 320.

In block 321, the second interface 42 receives the historical data from the database 10 and the real-time data from the sensing unit 20 and the communication unit 30.

In block 322, the processing module 43 calculates category-based predictions for one or more queries from a user of the vehicle based on the received historical data and the real-time data. The categories of the predictions are pre-defined. For example, the pre-defined categories are stored in the processing module 43. The pre-defined categories include vehicle status, vehicle control, comfort settings, a user travel plan and user preferences. One or more of the categories include subcategories or multi-level subcategories.

In an example, the pre-defined categories of predictions have a directory for quick retrieval of a prediction from the predictions. Similarly, subdirectories can be provided for the subcategories, and multi-level subcategories can be provided for the multi-level subcategories.

An example of the categories and their multi-level sub-categories are illustrated in Table 1 below.

TABLE 1

| | | |
|---|---|---|
| Vehicle status | Abnormal | Abnormal type |
| | | Abnormal risk level |
| | | Abnormality response advice |
| | Healthy | Health index |
| | | Recommendation |
| Vehicle control | Driving mode | Recommended driving mode |
| | | User preference of driving mode |
| | Electronic function | Automatic start-stop setting |
| | | Auto hold setting |
| Comfort | Air conditioner | Driver's seat temperature |
| | | Co-pilot seat temperature |
| | | Rear seat temperature |
| | | Air conditioner operation mode |
| | | Air volume level |
| | Heating | Steering wheel heating |
| | | Driver's seat heating |
| | | Co-pilot seat heating |
| User Preference | Navigation preference | Refueling preference |
| | | Charging preference |
| | | Routing preference |
| | Search preference | Dietary preference |
| | | Music preference |
| User travel | Travel advice | Next trip |
| | | Trip planning |

In an example, the categories as well as their multi-level subcategories are extensible. For example, when new information is obtained while the vehicle is travelling, one or more new categories, or one or more new subcategories can be added if needed. For example, it is detected that the vehicle frequently enters and leaves a geo-fence area. In this case, a new subcategory regarding whether the vehicle is within the geo-fence area could be added into the category of "User travel."

In an example, at least one of the categories or at least one of the multi-level subcategories is adjustable according to habits or preferences of the user. For example, the "Next trip" in Table 1 could be adjusted to "Morning trip" and "Afternoon trip" if it is more reasonable to plan the user's trip in the morning and afternoon according to the obtained data regarding travel rules of the user.

Next, the advice providing apparatus 40 can generate an operation advice based on a prediction selected from the calculated predictions if a nonrepresentational input, as further explained below, is received from the user, and then provide the generated operation advice to the HMI APP 102. The advice providing apparatus 40 can also generate an operation advice based on a prediction selected from the calculated predictions that is associated with a current scene, and then broadcast the generated operation advice to the HMI APP 102.

Examples of providing an operation advice in response to a nonrepresentational input are described with reference to blocks 323-325.

In block 323, at least one HMI of the vehicle receives a nonrepresentational input from the user of the vehicle.

The "nonrepresentational input" refers to an input that is ambiguous such that the HMI APP 102 cannot determine an expectation of the user with only one or a few rounds of interactions. For example, the nonrepresentational input may require multiple rounds of interactions between the user and the vehicle to determine the expectation of the user. Examples of the nonrepresentational input are described below.

In an example, during an interaction by voice, the user says "too hot." In this case, a voice APP cannot determine whether the user wants to open the window or turn on the air conditioner. The voice input of "too hot" is a nonrepresentational input. In response to the nonrepresentational input, the voice APP sends an inquiry message including a description of "too hot" to the advice providing apparatus 40 via the first interface 41.

In another example, during an interaction through a touch screen, the user activates a function of searching nearby by touching the touch screen. In this case, the touch screen APP can neither determine the type of places to be searched nor the user's preference on restaurant if the user is to search for restaurant. The user input to the touch screen is a nonrepresentational input. In response to the nonrepresentational input, the touch screen APP sends an inquiry message including a description of "searching nearby" to the advice providing apparatus 40 via the first interface 41.

In block 324, the processing module 43 selects a prediction that is associated with the nonrepresentational input from the calculated predictions.

In an example, the processing module 43 predicts an expectation of the user and selects a prediction that satisfies the expectation of the user from the calculated predictions. For example, the processing module 43 predicts the expectation of the user that corresponds to the nonrepresentational input by means of a predicting model (e.g., a trained machine learning model). The processing module 43 inputs the nonrepresentational input to the predicting model, and the predicting model outputs the expectation of the user that corresponds to the nonrepresentational input.

In an example, the processing module 43 generates a description of the nonrepresentational input using a keyword. Then, the processing module 43 searches the directory of the categories to select one category tagged with a keyword matching with the keyword of the nonrepresentational input. The processing module 43 extracts one or more predictions of the selected category, and then selects the prediction from the extracted predictions that satisfies the expectation of the user.

In block 325, the processing module 43 generates an operation advice based on the selected prediction. In an example, the processing module 43 uses the selected prediction as the operation advice. For example, the selected prediction is "setting the temperature to 26 degrees". In this case, the prediction can be directly used as the operation advice. In another example, the processing module 43 analyzes the selected prediction and determines that a second confirmation is required from the user. For example, the selected prediction is "braking the vehicle". In this case, the processing module 43 generates a query of "whether to brake the vehicle" as the operation advice.

In block 326, the processing module 43 outputs the generated operation advice to the at least one HMI.

It is noted that the processing module 43 may receive two or more nonrepresentational inputs from multiple HMIs. In this case, the processing module 43 can generate multiple operation advices each of which corresponds to a nonrepresentational input according to embodiments as described above.

Examples of broadcasting an operation advice are described with reference to blocks 327-329.

In block 327, the processing module 43 selects a prediction that is suitable for a current scene from the calculated predictions.

In an example, the processing module 43 predicts an expectation of the user under the current scene based on the real-time data, and selects a prediction that satisfies the expectation of the user from the calculated predictions. For example, the processing module 43 processes the real-time data and determines that the current scene is waiting at a traffic light, and predicts that the expectation of the user when waiting at a traffic light is playing music according to user historical data.

Then, the processing module 43 generates an operation advice based on the selected predication at block 328 and then broadcasts the generated operation advice to the HMI APP 102 at block 329, such that the HMI APP 102 actively interacts with the user or performs a vehicle operation according to the operation advice to minimize the number of interactions between the user and the vehicle. In an example, the selected prediction is playing music. The generated operation advice could be "playing music." Then, the operation advice of "playing music" is broadcasted to a music APP and the music APP plays music according the operation advice. In this example, the generated operation advice could also be "playing music after one minute". Then, the operation advice of "playing music" is broadcasted to the music APP and the music APP plays music after one minute according the operation advice.

Next, the updating process 330 is performed.

In block 331, the at least one HMI receives a new user input which is a user response to the operation advice. Meanwhile, corresponding vehicle status and environment status are recorded.

In an example, a voice APP of the vehicle receives an operation advice of "setting the air conditioner to a temperature of 26 degrees". In response to receiving this operation advice, the voice APP provides a question of whether to set the temperature of the air conditioner to 26 degrees to the user, and then the user answers "YES". In this case, the answer "YES" from the user is the new user input in response to the operation advice. The vehicle status and environment status when the user answers "YES" are recorded.

In block 332, the database 10 stores the new user input as updated historical interaction data, stores the corresponding vehicle status as updated historical vehicle data, and stores the corresponding environment status as updated historical environment data. In an example, for each updating process, the updated historical vehicle data and the updated historical environment data are stored in association with the updated historical interaction data.

In the case that the updated historical data have been stored in the database 10, the updated data can be obtained from the database 10 and used for generating operation advices of subsequent rounds, and can also be used for retraining the model/algorithm used by the processing module 43. In this way, data can be recurrently used for computing and model training. That is to say, the data can feed the computing and the model. Thus, a data-driven approach is realized.

The experiments on interactions between the user and the vehicle have shown that the number of interactions to meet the user's expectation can be greatly reduced. Based on statistical results, at least more than 50% of invalid interactions can be saved by applying the advice providing logic according to examples of the disclosure, because the advice providing logic is designed to better understand the user's request and know how to meet the user's expectation.

Below, an embodiment of the disclosure is described where the user intends to set an air conditioning temperature by using a voice APP or an air conditioning control APP.

First, a relational database is previously established in the vehicle, e.g., in a central controller, a domain controller, or an infotainment system of the vehicle. Each time the user sets an air conditioning temperature, the following data are stored in the database 10 as the historical data: a) season and time; b) inside and outside temperatures of the vehicle; c) environment status and air quality outside vehicle; d) a number of occupants in the vehicle; e) states of vehicle windows; f) a speed of the vehicle; g) an air conditioning temperature, an air volume, a wind direction, and an air conditioning operation mode (e.g., an internal or external cycle) set by the user.

Then, the following real-time data are collected by the sensing unit 20 and the communication unit 30: a) real-time temperatures inside and outside the vehicle; b) current air conditioning states including the temperature, an air volume, an wind direction, and an air conditioning operation mode; c) a current number of occupants in the vehicle; d) current season; e) current lengths of day time and night time according to the international standard; f) real-time weather conditions and air quality conditions outside the vehicle.

Then, the processing module 43 calculates, based on the historical data and real-time data, one or more air conditioning temperatures that the user is likely to set under the current scene. The calculated temperatures can be seen as the predictions belonging to the category of air conditioning setting.

Then, in an example, the HMI of the voice APP or the HMI of the air conditioning control APP receives a nonrepresentational input related to air conditioning setting from the user, and the voice APP or the air conditioning control APP sends a query message including a description of the nonrepresentational input to the advice providing apparatus 40 via the first interface 41. In response to the query message, the advice providing apparatus 40 selects an air conditioning temperature that is associated with the nonrepresentational input from the calculated temperatures, and generates an operation advice of setting the air conditioning to the selected temperature. Then, the advice providing apparatus 40 outputs the generated operation advice to the voice APP or the air conditioning control APP.

In another example, the advice providing apparatus 40 selects an air conditioning temperature that is suitable for the current scene from the calculated air conditioning temperatures, and generates an operation advice of setting the air conditioning to the selected temperature. The advice providing apparatus 40 broadcasts the operation advice to the voice APP or the air conditioning control APP, such that the voice APP or the air conditioning control APP actively establishes an interaction with the user to confirm whether the air conditioning setting should be performed.

In response to the operation advice, the user may perform a new air conditioning setting. The new air conditioning setting as well as corresponding new vehicle status and corresponding new environment status are stored in the database 10 as updated historical data.

In another embodiment, an operation advice for preparing activities needed for the user's next trip is provided by the operation advice providing apparatus 40.

First, the following data are stored in the database 10 as the historical data: a) an energy consumption model of a powertrain of the vehicle, e.g., the energy consumption model including energy consumption curves of the powertrain under different environments, working conditions, road conditions, or routes; b) the optimal charge-discharge curve model of a power battery of the vehicle under different energy states, environments, working conditions, road conditions, or routes; c) the user's habit of refueling energy, e.g., refueling energy after remaining energy being less than a certain threshold, refueling energy on the way, and refueling energy after reaching the destination; d) the user's habit of daily driving, e.g., pre-warming or pre-cooling the vehicle, driving style, and route selection.

The following real-time data are also collected by the sensing unit 20 and the communication unit 30 and sent to the processing module 43: a) the user's next trip; b) remaining energy; 3) current weather and climate conditions; c) a current location of the vehicle.

Then, the processing module 43 calculates, based on the historical data and the real-time data, predictions of an amount of energy and travel time required for the user's next trip and whether the remaining energy is enough for the user's next trip.

Next, the processing module 43 selects a prediction that is suitable for a current scene from the calculated predictions and generates an operation advice based on the selected prediction. The processing module 43 outputs the operation advice to one or more HMI APPs via the first interface 41 such that the one or more APPs actively establish interactions with the user. For example, the generated operation advice may include one or more of: a) refueling energy at a recommend charging station on the way; b) a recommended departure time to ensure timely arrival; and c) turning on the air conditioning five minutes later.

Notably, prior art solutions have the problem of inconsistent answers from different HMI APPs when the user asks the same question to those HMI APPs. That is to say, different HMI APPs of the vehicle may provide different feedbacks to the same user inquiry. This problem is largely due to that those HMI APPs run independently, particularly that the data sources for those HMI APPs are different from each other. Further, the processing logic of each HMI APP is unknown to public and not uniform, and thus each HMI APP processes data with its own processing logic.

In this regard, as described above, the advice providing system 100 communicates with the same data source, i.e., the data source 104, and thereby the metadata involved in data processing by each HMI APP is the same. Further, according to embodiments of the disclosure, the metadata are uniformly processed such that the consistent operation advice can be generated by different HMI APPs.

In addition, the processing module 43 can also process the received data such that differences in data accuracy caused by the vehicle hardware including the sensing unit 20 and the communication unit 30 are minimized.

For example, differences in the vehicle hardware may have a negative impact on the received data accuracy and thus on the consistency of the generated operation advice. For example, vehicles of different brands may use different hardware parts, and vehicles of the same brand may also use different hardware parts in different production batches, which may lead to different accuracies of the received data, thereby causing the problem of generating an inaccurate operation advice. In this regard, according to an embodiment of the disclosure, differences in the vehicle hardware are absorbed so that the different accuracies of the received data can be adjusted to the same level, regardless of different manufacturers, models, or batches. The absorbing of hardware differences can be implemented in different ways. In an example, if the received data have different levels of accuracies, the processing module 43 processes the received data such that the different levels of accuracies are adjusted to the same level. In another example, the accuracy level of data is firstly defined, and thus the part suppliers could provide data with the defined accuracy level. In this way, the obtained data can be with the same accuracy level.

In addition, the processing module 43 includes data processing to minimize the differences in prediction accuracy caused by the vehicle software including different HMI APPs.

In an example, differences in the vehicle software may have a negative impact on the consistency of the generated operation advice. The differences caused by vehicle software include differences caused by different software operating systems or different software versions. According to an embodiment of the disclosure, the differences in the vehicle software can be absorbed. For example, the processing module 43 sets various API parameters for ensuring the compatibility with different operating systems or different software versions. Further, the API parameters can be dynamically adjusted for vehicles of different brands.

An example of generating a consistent operation advice by different HMI APPs is described below.

In an example, a driver of a vehicle asks for a current weather condition via a voice APP of the vehicle. At the same time, an occupant of the vehicle asks for the current weather condition via a climate APP of the vehicle. According to prior art solutions, the two APPs may provide different weather conditions, because the two APPs are running independently, they obtain metadata from different data sources and use different processing logics. According to an embodiment of present disclosure, both APPs could provide the same weather condition, because they will receive the same advice from the advice providing apparatus 40.

Figure 4:
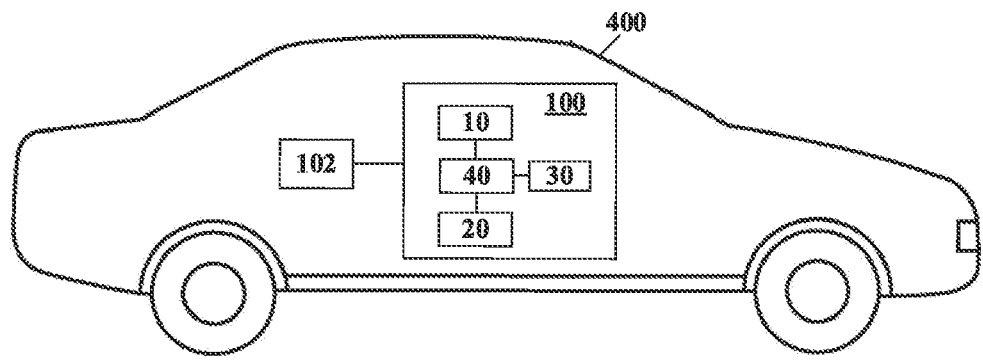
FIG. 4 shows a vehicle according to an embodiment of the disclosure.

FIG. 4 shows a vehicle 400 according to an embodiment of the disclosure. The vehicle 400 includes the above-mentioned advice providing apparatus 40 or the above-mentioned advice providing system 100. The vehicle further includes the above-mentioned HMI APP 102. The providing apparatus 40 or the advice providing system 100 is communicatively connected with the human-machine interaction APP 102. The providing apparatus 40 or the advice providing system 100 generates operation advices as described above. The above-described features and advantages of the providing apparatus 40 and the advice providing system 100 are also applicable here.

Figure 5:
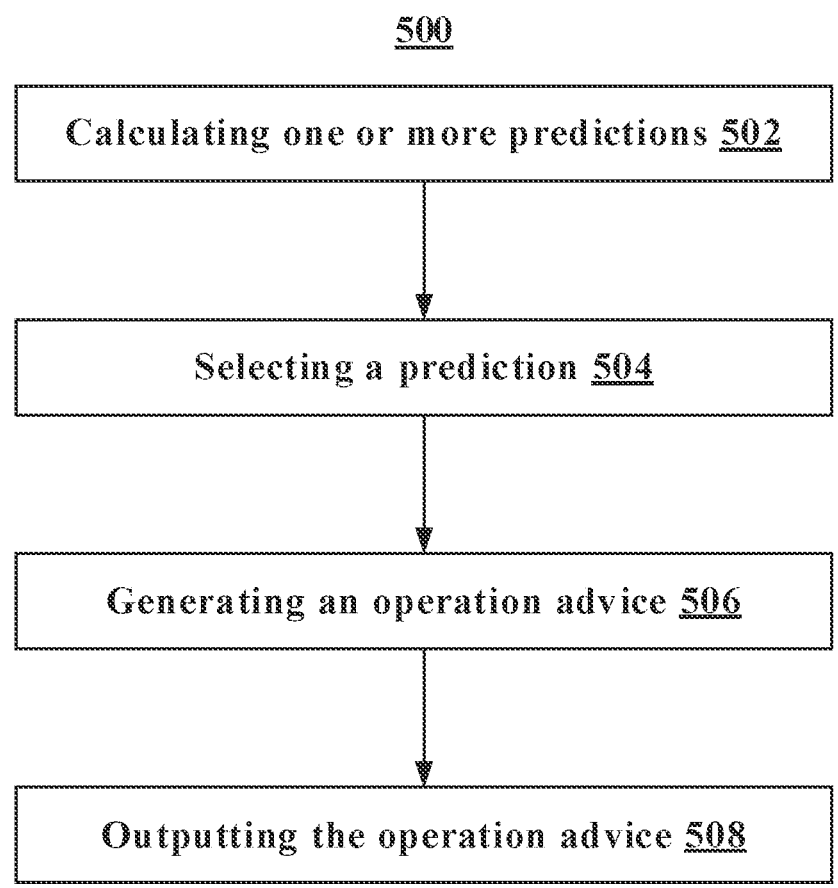
FIG. 5 is a flowchart of an advice providing method for a vehicle according to an embodiment of the disclosure.

FIG. 5 illustrates an advice providing method 500 according to an embodiment of the present disclosure. The method 500 can be performed by the above-mentioned advice providing apparatus 40 or the above-mentioned advice providing system 100, and thus the above described features and advantages of the providing apparatus 40 and the advice providing system 100 are also applicable here.

In step S502, one or more predictions for a potential query from a user of the vehicle are calculated based on data received from in-vehicle devices including a database, a sensing unit and a communication unit.

In step S504, a prediction is selected from the calculated predictions that is associated with a nonrepresentational input received via at least one HMI of one or more HMIs from the user.

In step S506, an operation advice is generated based on the selected prediction.

In step S508, the generated operation advice is output to an HMI APP of one or more HMI APPs that corresponds to the at least one HMI.

The disclosure provides a non-transitory computer-readable medium with instructions stored therein which, when executed, causes a processor to carry out the steps of the advice providing method described above.

It is noted that all the operations in the method described above are merely exemplary, and the disclosure is not limited to any operations in the method or sequence orders of these operations, and should cover all other equivalents under the same or similar concepts.

The processors can be implemented using electronic hardware, computer software, or any combination thereof. Whether these processors are implemented as hardware or software will depend on the specific application and the overall design constraints imposed on the system. By way of example, a processor, any portion of a processor, or any combination of processors presented in this disclosure may be implemented as a microprocessor, a micro-controller, a digital signal processor (DSP), a field programmable gate array (FPGA), a programmable logic device (PLD), state machine, gate logic, discrete hardware circuitry, and other suitable processing components configured to perform the various functions described in this disclosure. The functions of a processor, any portion of a processor, or any combination of processors presented in this disclosure may be implemented as software executed by a microprocessor, a micro-controller, a DSP, or other suitable platforms.

Software should be interpreted broadly to represent instructions, instruction sets, code, code segments, program code, programs, subroutines, software modules, applications, software applications, software packages, routines, subroutines, objects, running threads, processes, functions, and the like. Software can reside on a non-transitory computer-readable medium. Such non-transitory computer-readable medium may include, for example, a memory, which may be, for example, a magnetic storage device (e.g., a hard disk, a floppy disk, a magnetic strip), an optical disk, a smart card, a flash memory device, a random access memory (RAM), a read only memory (ROM), a programmable ROM (PROM), an erasable PROM (EPROM), an electrically erasable PROM (EEPROM), a register, or a removable disk.

Although a memory is shown as being separate from the processor in various aspects presented in this disclosure, a memory may also be internal to the processor, e.g., a cache or a register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalent transformations to the elements of the various aspects of the disclosure, which are known or to be apparent to those skilled in the art, are intended to be covered by the claims.

What is claimed is:

1. An advice providing apparatus for a vehicle, comprising:
    a first interface configured to communicate with one or more human-machine interface applications (HMI APPs) disposed on one or more human-machine interfaces (HMIs) of the vehicle;
    a second interface configured to receive data from in-vehicle devices including a database, a sensing unit and a communication unit; and
    a processing module configured to:
    calculate one or more predictions for a potential query from a user of the vehicle based on the received data, wherein the one or more predictions are predetermined category-based predictions and comprise multiple categories of vehicle status, vehicle control, comfort settings, a user travel plan, and user preferences, wherein at least one of the categories is adjustable according to driving preferences of the user, wherein one or more new categories are added to the multiple categories when new information is obtained while the vehicle is traveling such that the performance of the advice providing apparatus is continuously updated while the vehicle is traveling,
        wherein the category of vehicle status comprises vehicle abnormality related sub-categories and vehicle health related sub-categories, and the vehicle abnormality related sub-categories comprise an abnormal type, an abnormal risk level, and an abnormality response advice, wherein the vehicle health related sub-categories comprise a health index and a health recommendation, and
        wherein the processing module is further configured to process data of the received data associated with at least one of the abnormal type, the abnormal risk level, the abnormality response advice, the health index, or the health recommendation sub-categories such that differences in prediction accuracy caused by at least one of vehicle software including the one or more HMI APPs, different operating systems, or different software versions of the vehicle software indicated by the data of the received data associated with at least one of the abnormal type, the abnormal risk level, the abnormality response advice, the health index, or the health recommendation sub-categories are minimized;
    select a prediction from the calculated predictions that is associated with a nonrepresentational input received via at least one HMI of the one or more HMIs from the user;
    generate an operation advice based on the selected prediction to minimize a number of interactions between the user and the at least one HMI; and
    output the generated operation advice to a suitable HMI APP of the one or more HMI APPs.

2. The advice providing apparatus of claim 1, wherein the received data comprise historical data received from the database and real-time data received from the sensing unit and the communication unit; and
    wherein both the historical data and the real-time data comprise data related to human-machine interactions, a vehicle status, and an environment status.

3. The advice providing apparatus of claim 2, wherein the processing module is further configured to:
    predict an expectation of the user under a current scene based on the real-time data;
    select a further prediction that satisfies the expectation of the user from the calculated predictions;
    generate a further operation advice based on the further prediction as an advice under the current scene; and
    broadcast the further operation advice to the one or more HMI APPs.

4. The advice providing apparatus of claim 1, wherein the nonrepresentational input comprises an ambiguous user input and it requires at least two rounds of interactions between the user and the at least one HMI to determine the user's input.

5. The advice providing apparatus of claim 4, wherein selecting the prediction from the calculated predictions comprises selecting the prediction of the user from the calculated predictions.

6. The advice providing apparatus of claim 1, wherein the historical data further comprise updated historical data including the user's response to the operation advice.

7. The advice providing apparatus of claim 1, wherein the processing module is further configured to process the received data such that differences in data accuracy caused by vehicle hardware including the sensing unit and the communication unit are minimized.

8. The advice providing apparatus of claim 7, wherein the differences in data accuracy are caused by at least one of following reasons: different manufacturers, different batches, and different operating states of the vehicle hardware.

9. The advice providing apparatus of claim 1, wherein the apparatus is disposed in a domain controller or a central controller or an electronic control unit of the vehicle.

10. An advice providing method for a vehicle, comprising:
    calculating one or more predictions for a potential query from a user of the vehicle based on data received from in-vehicle devices including a database, a sensing unit, and a communication unit, wherein the one or more predictions are predetermined category-based predictions and comprise multiple categories of vehicle status, vehicle control, comfort settings, a user travel plan, and user preferences, wherein at least one of the categories is adjustable according to driving preferences of the user, wherein one or more new categories are added to the multiple categories when new information is obtained while the vehicle is traveling such that the performance of the advice providing apparatus is continuously updated while the vehicle is traveling,
        wherein the category of vehicle status comprises vehicle abnormality related sub-categories and vehicle health related sub-categories, and the vehicle abnormality related sub-categories comprise an abnormal type, an abnormal risk level, and an abnormality response advice, wherein the vehicle health related sub-categories comprise a health index and a health recommendation, and wherein the processing module is further configured to process data of the received data associated with at least one of the abnormal type, the abnormal risk level, the abnormality response advice, the health index, or the health recommendation sub-categories such that differences in prediction accuracy caused by at least one of vehicle software including the one or more HMI APPs, different operating systems, or different software versions of the vehicle software indicated by the data of the received data associated with at least one of the abnormal type, the abnormal risk level, the abnormality response advice, the health index, or the health recommendation sub-categories are minimized;

selecting a prediction from the calculated predictions that is associated with a nonrepresentational input received via at least one HMI of the vehicle from the user;

generating an operation advice based on the selected prediction to minimize a number of interactions between the user and the at least one HMI; and outputting the generated operation advice to an HMI APP of the vehicle that corresponds to the at least one HMI.

11. A vehicle comprising:

a database configured to store historical data related to human-machine interactions, a vehicle status, and an environment status;

a sensing unit and a communication unit configured to collect or receive real-time data including data related to the human-machine interactions, the vehicle status, and the environment status; and an apparatus for providing advice comprising:

a first interface configured to communicate with one or more human-machine interface APPs of one or more human-machine interfaces (HMIs) of the vehicle;

a second interface configured to receive historical data from the database and receive real-time data from the sensing unit and the communication unit; and a processing module configured to:

calculate one or more predictions for a potential query from a user of the vehicle based on the historical data and the real-time data, wherein the one or more predictions are predetermined category-based predictions and comprise multiple categories of vehicle status, vehicle control, comfort settings, a user travel plan, and user preferences, wherein at least one of the categories is adjustable according to driving preferences of the user, wherein one or more new categories are added to the multiple categories when new information is obtained while the vehicle is traveling such that the performance of the advice providing apparatus is continuously updated while the vehicle is traveling, wherein the category of vehicle status comprises vehicle abnormality related sub-categories and vehicle health related sub-categories, and the vehicle abnormality related sub-categories comprise an abnormal type, an abnormal risk level, and an abnormality response advice, wherein the vehicle health related sub-categories comprise a health index and a health recommendation, and wherein the processing module is further configured to process data of the received data associated with at least one of the abnormal type, the abnormal risk level, the abnormality response advice, the health index, or the health recommendation sub-categories such that differences in prediction accuracy caused by at least one of vehicle software including the one or more HMI APPs, different operating systems, or different software versions of the vehicle software indicated by the data of the received data associated with at least one of the abnormal type, the abnormal risk level, the abnormality response advice, the health index, or the health recommendation sub-categories are minimized;

select a prediction from the calculated predictions that is associated with a nonrepresentational input received via at least one HMI of the one or more HMIs from the user;

generate an operation advice based on the selected prediction to minimize a number of interactions between the user and the at least one HMI; and output the generated operation advice to an HMI APP of the one or more HMI APPs that corresponds to the at least one HMI.

* * * * *